US010907396B2

(12) United States Patent
Pignard

(10) Patent No.: US 10,907,396 B2
(45) Date of Patent: Feb. 2, 2021

(54) SYSTEM FOR OPENING A TAILGATE HAVING A PLURALITY OF OPENING KINEMATICS

(71) Applicant: FLEX-N-GATE FRANCE, Audincourt (FR)

(72) Inventor: Frederic Pignard, Montbeliard (FR)

(73) Assignee: FLEX-N-GATE FRANCE, Audincourt (FR)

( * ) Notice: Subject to any disclaimer, the term of this patent is extended or adjusted under 35 U.S.C. 154(b) by 152 days.

(21) Appl. No.: 15/759,146

(22) PCT Filed: Sep. 12, 2016

(86) PCT No.: PCT/EP2016/071464
§ 371 (c)(1),
(2) Date: Mar. 9, 2018

(87) PCT Pub. No.: WO2017/042391
PCT Pub. Date: Mar. 16, 2017

(65) Prior Publication Data
US 2019/0055767 A1 Feb. 21, 2019

(30) Foreign Application Priority Data
Sep. 11, 2015 (FR) .................................... 15 58495

(51) Int. Cl.
*E05F 15/63* (2015.01)
*B60J 5/10* (2006.01)
(Continued)

(52) U.S. Cl.
CPC ............... *E05F 15/63* (2015.01); *B60J 5/106* (2013.01); *E05F 1/1091* (2013.01); *E05F 15/60* (2015.01);
(Continued)

(58) Field of Classification Search
CPC ...... E05F 15/655; E05F 15/659; E05F 15/662; E05Y 2900/546
See application file for complete search history.

(56) References Cited

U.S. PATENT DOCUMENTS 5,384,975 A 1/1995 Yuran
5,563,483 A * 10/1996 Kowall .................. E05B 81/14
318/266
(Continued)

FOREIGN PATENT DOCUMENTS

EP 0301960 A1 2/1989
EP 1454782 A1 9/2004
(Continued)

OTHER PUBLICATIONS

French Preliminary Search Report for application No. FR1558495, dated Jun. 23, 2016, 2 pages.
(Continued)

*Primary Examiner* — Marcus Menezes
(74) *Attorney, Agent, or Firm* — Reising Ethington P.C.

(57) ABSTRACT

A rear vehicle assembly includes a body structure defining an opening having a first side edge and a second side edge and including a tailgate that is movable relative to the structure between at least one open position, in which the opening of the structure is accessible, and a closed position, in which the tailgate closes the opening of the structure, wherein the tailgate comprises at least a first side edge and a second side edge. The assembly includes an opening and closing device fixing the tailgate to the structure. The opening and closing device includes at least a first jack and a second jack, wherein the first and second jacks are each fixed between the structure and the first side edge.

6 Claims, 2 Drawing Sheets

(51) Int. Cl.
*E05F 15/73* (2015.01)
*E05F 1/10* (2006.01)
*E05F 15/616* (2015.01)
*E05F 15/611* (2015.01)
*E05F 15/668* (2015.01)
*E05F 15/60* (2015.01)

(52) U.S. Cl.
CPC .......... *E05F 15/611* (2015.01); *E05F 15/616* (2015.01); *E05F 15/668* (2015.01); *E05F 15/73* (2015.01); *E05Y 2900/546* (2013.01)

(56) References Cited

U.S. PATENT DOCUMENTS

| | | | | |
|---|---|---|---|---|
| 5,588,258 | A * | 12/1996 | Wright | E05F 15/627 49/340 |
| 5,986,420 | A * | 11/1999 | Kato | E05F 15/619 318/1 |
| 6,298,604 | B1 * | 10/2001 | Rogers, Jr. | B62D 25/105 296/106 |
| 6,516,567 | B1 * | 2/2003 | Stone | E05F 15/622 296/55 |
| 6,719,356 | B2 * | 4/2004 | Cleland | E05F 1/1091 296/146.8 |
| 7,070,226 | B2 * | 7/2006 | Cleland | E05F 1/1091 296/146.8 |
| 10,180,025 | B2 * | 1/2019 | Conner | E05F 15/622 |
| 2002/0074959 | A1 * | 6/2002 | Van Wiemeersch | G07C 9/00182 318/445 |
| 2004/0020126 | A1 * | 2/2004 | Matsui | E05B 81/20 49/138 |
| 2004/0232723 | A1 * | 11/2004 | Sera | E05F 15/70 296/146.8 |
| 2005/0046229 | A1 * | 3/2005 | Yamada | B60J 5/101 296/146.8 |
| 2007/0051046 | A1 * | 3/2007 | Yoshida | E05F 15/63 49/345 |
| 2007/0262609 | A1 * | 11/2007 | King | B60J 5/101 296/146.8 |
| 2018/0283072 | A1 * | 10/2018 | Laurent | B60J 5/106 |

FOREIGN PATENT DOCUMENTS

| | | | | |
|---|---|---|---|---|
| FR | 2880303 | A1 * | 7/2006 | B60J 5/106 |
| JP | H0168916 | U | 5/1989 | |

OTHER PUBLICATIONS

International Search Report for International application No. PCT/EP2016/071464, dated Nov. 18, 2016, 3 pages.
Written Opinion in French for International application No. PCT/EP2016/071464, dated Nov. 18, 2016, 6 pages.

* cited by examiner

SYSTEM FOR OPENING A TAILGATE HAVING A PLURALITY OF OPENING KINEMATICS

TECHNICAL FIELD

The present invention relates to a rear vehicle assembly comprising:
- a body structure, wherein the body structure delimits an opening comprising at least a first side edge of the opening and a second side edge of the opening,
- a tailgate, wherein the tailgate is movable relative to the body structure between at least one open position, in which the opening of the body structure is accessible, and a closed position, in which the tailgate closes the opening of the body structure, wherein the tailgate comprises at least a first tailgate side edge and a second tailgate side edge, and
- an opening and closing device, wherein the opening and closing device secures the tailgate to the body structure.

BACKGROUND

Such an assembly is intended, in particular, to provide access to the trunk of a motor vehicle by opening the tailgate. A user of the motor vehicle may thus easily load and unload, for example, bulky objects from the rear of the vehicle by opening the tailgate.

Such a tailgate generally opens by rotation of the tailgate, wherein it passes from a closed position that is substantially parallel to the plane of the opening of the body structure, to an open position that is substantially perpendicular to the plane of the opening of the body structure, wherein the tailgate extends above the user's head.

However, such tailgates must be able to open to different opening positions. For example, these different opening positions must be adapted to a limited height in restricted surroundings or allow the tailgate to shelter the trunk in bad weather.

To do this, opening and closing devices are known that offer different opening positions, comprising, in addition to the hinging of the tailgate on the body structure, a jack to limit the movement of the opening of the tailgate.

However, such devices offer limited possibilities in terms of opening kinematics and restricts the number of possible open positions.

Furthermore, document EP1454782 discloses a tailgate opening and closing device comprising a first arm and a first jack mounted between the body structure and one side of the tailgate and a second arm and a second jack mounted between the body structure and the other side of the tailgate in order to offer different opening kinematics.

However, such a device is not completely satisfactory. In fact, the opening and closing device only offers a limited number of open positions of the tailgate. Thus, such a device does not allow, for example, the tailgate to release optimal access to the trunk when the vehicle comprises a roof box.

SUMMARY

An object of the invention is to provide a rear vehicle assembly, whose tailgate opening and closing device offers improved features to provide an increased number of open positions compared to the prior art.

For this purpose, the invention particularly relates to an assembly of the aforementioned type, wherein the opening and closing device comprises at least a first jack and a second jack, wherein the first jack and the second jack are each fixed between the body structure and the first tailgate side edge.

Insofar as the opening and closing device comprises at least two jacks fixed between the body structure and the first tailgate side edge, a greater number of opening positions is provided than opening and closing devices known in the prior art. These opening positions are then adapted to a multitude of surroundings and a variety of modes of use of the trunk.

The assembly according to the invention may comprise one or more of the following characteristics, taken in isolation or in any technically possible combination:
- the first jack and the second jack are offset along the first tailgate side edge;
- the first jack and the second jack are each rotatably mounted on the body structure;
- the first jack and the second jack are each mounted to rotate about two respective first axes of rotation of the body structure, wherein the first axes of rotation are distinct from one another;
- the first axes of rotation are spaced at least 10 centimeters apart;
- the first jack and the second jack are each rotatably mounted on the tailgate;
- the first jack and the second jack are each rotatably mounted on the first tailgate side edge;
- the first jack and the second jack are mounted to rotate about two respective second axes of rotation of the first side edge of the tailgate, wherein the second axes of rotation are distinct from each other;
- the opening and closing device comprises a third jack and a fourth jack, wherein the third jack and the fourth jack are fixed between the body structure and the second tailgate side edge;
- each jack comprises a fixed part and a movable part, wherein the movable part is integral with the tailgate and the fixed part is integral with the body structure;
- at least the first jack defines an angle with the axis of the opening and comprises first angular motorization means designed to vary the first angle;
- at least the first jack and the second jack comprise second motorization means designed to control the movement of the jacks;
- the rear assembly comprises a computer capable of controlling the first angular motorization means and the second motorization means;
- the computer is able to control the displacement of the jacks to a plurality of opening positions and according to a plurality of opening kinematics;
- the tailgate comprises at least one obstacle sensor fixed on the tailgate, the obstacle sensor being arranged to detect the presence of at least one object in the surroundings of the tailgate, and
- the body structure and tailgate are only connected by the opening and closing device.

BRIEF DESCRIPTION OF THE DRAWINGS

The invention will be better understood upon reading the description which follows, given solely by way of example, and with reference to the appended drawings, wherein.

DETAILED DESCRIPTION

Figure 1:
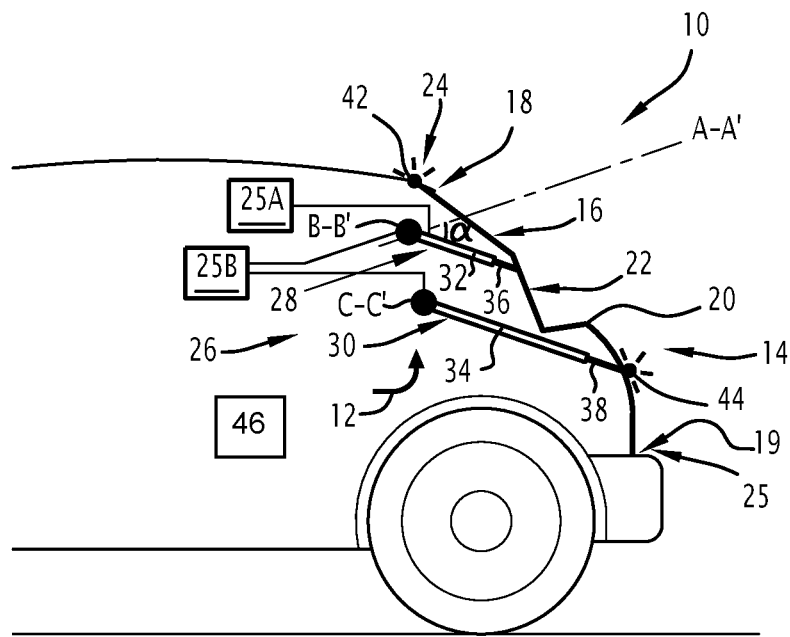
FIG. 1 shows a schematic representation in section, along a longitudinal plane passing through the rear of the vehicle, of the rear assembly according to the invention, wherein the tailgate is in the closed position.

In all that follows, the orientations are the usual orientations of a motor vehicle. In particular, the terms "upper", "lower", "left", "right", "above", "below", "forward" and "backward" generally mean relative to the normal direction of movement of the motor vehicle and the position of the driver.

A rear assembly 10 of a vehicle is shown in FIGS. 1 to 4.

The rear assembly 10 comprises a body structure 12.

The body structure 12 defines an opening 14.

The opening 14 is designed to give access to the interior of a rear part of a vehicle, for example the trunk and/or the rear shelf of the vehicle, from outside the vehicle.

The opening 14 comprises at least a first side edge of the opening 16 and a second side edge of the opening, formed by uprights of the body structure 12.

The first side edge of the opening 16 extends substantially in a direction of elevation of the vehicle and is located, for example, to the left of the vehicle.

For symmetry, the second side edge of the opening extends substantially in a direction of elevation of the vehicle and is located, for example, to the right of the vehicle.

The opening 14 further comprises an upper edge of the opening 18, extending, for example, between the roof of the vehicle and the side edges of the opening 14, while a lower edge of the opening 19, extends, for example, between the floor of the vehicle and the side edges of the opening 14.

The opening 14, thus delimited by the first side edge of the opening 16, the second side edge of the opening, the upper edge of the opening 18 and the lower edge of the opening 19, extends in one or several planes that are substantially perpendicular, or inclined with respect to the longitudinal axis of the vehicle.

The opening 14 further defines an axis of the opening A-A', wherein the axis of the opening A-A' is perpendicular to one of the above defined planes in which the opening 14 extends.

The rear assembly 10 also comprises a tailgate 20.

Such a tailgate 20 is usual in motor vehicles and comprises, for example, glazed surfaces, rear vehicle optics, etc.

The tailgate 20 comprises at least a first tailgate side edge 22, a second tailgate side edge, a tailgate upper edge 24 and a tailgate lower edge 25.

The tailgate 20 is movable relative to the body structure 12 between at least one open position and a closed position.

In an open position, the opening 14 of the body structure 12 is accessible from outside the vehicle. The first tailgate side edge 22 and the second tailgate side edge respectively face the first side edge of the opening 16 and the second side edge of the opening.

In the closed position, the opening 14 of the body structure 12 is isolated from the outside surroundings of the vehicle. The first tailgate side edge 22 and the second tailgate side edge are then respectively pressed against the first side edge of the opening 16 and the second side edge of the opening, while the upper tailgate edge 24 and the lower tailgate edge 25 are respectively pressed against the upper edge of the opening 18 and the lower edge of the opening 19.

When the tailgate 20 is in the closed position, it extends in one or more planes that are substantially perpendicular to the longitudinal axis of the vehicle.

The rear assembly 10 further comprises an opening and closing device 26.

The opening and closing device 26 secures the tailgate 20 to the body structure 12.

More particularly, the opening and closing device 26 forms the only fixing of the tailgate 20 to the body structure 12, i.e. there is no other fixing element ensuring the fixing of the tailgate 20 to the body structure 12. The rear assembly 10 according to the invention thus has no direct articulation between the upper edge of the tailgate 24 and the upper edge of the opening 18 of the body structure 12, unlike conventional tailgates of motor vehicles. The opening and closing device 26 is then designed to keep the tailgate 20 closed in the event of a shock. Alternatively, the device 26 may further comprise a closing lock located at the lower edge 25 of the tailgate 20 and designed to interact with a holding member attached to the body structure 12. The lock ensures retention of the tailgate 20 on the body structure 12 in the event of a shock. Advantageously, the tailgate 20 also comprises two holding hooks located respectively at the upper level of the tailgate side edges and designed to keep the tailgate 20 on the body structure 12 in the event of a shock.

As illustrated in FIGS. 1 to 4, the opening and closing device 26 comprises a first jack 28 and a second jack 30.

Preferably, the jacks 28, 30 are each rotatably mounted on the body structure 12.

Preferably, the jacks 28, 30 are each mounted to rotate about two respective first axes of rotation of the body structure 12, wherein the first axes of rotation are distinct.

Advantageously, the first axes of rotation are spaced at least 10 centimeters apart.

Alternatively, the first axes of rotation may be spaced at least 20 centimeters apart.

Preferably, the jacks 28, 30 are each rotatably mounted on the tailgate 20.

In particular, the jacks 28, 30 are each rotatably mounted on the first tailgate side edge 22.

Preferably, the jacks 28, 30 are each mounted to rotate about two respective second axes of the first tailgate side edge 22, wherein the second axes of rotation are distinct.

Advantageously, the second axes of rotation are spaced at least 10 centimeters apart.

Alternatively, the second axes of rotation may be spaced at least 20 centimeters apart.

The first jack 28 and the second jack 30 each comprise a fixed portion 32, 34 and a movable portion 36, 38.

Each movable portion 36, 38 is respectively operable in translation relative to the associated fixed part 32, 34 between a retracted extreme position and an extended end position.

In the retracted extreme position, the jack 28, 30 has a minimum length.

In the extreme extended position, the jack 28, 30 has a maximum length.

The fixed parts 32, 34 are integral with the body structure 12 and, for example, are located in the vicinity of the first side edge of the opening 16. According to one embodiment, the fixed parts 32, 34 are fixed to the upright forming the first side edge of the opening 16.

The fixed parts 32, 34 are mounted to rotate about a first axis B-B' and a second axis C-C' respectively.

The first axis B-B' and the second axis C-C' are parallel to each other and perpendicular to a longitudinal direction of the vehicle.

Advantageously, the first axis B-B' and the second axis C-C' are spaced at least 10 centimeters apart.

Alternatively, the first axis B-B' and the second axis C-C' may be spaced at least 20 centimeters apart.

The moving parts 36, 38 are integral with the first tailgate side edge 22.

In particular, the first jack 28 and the second jack 30 are offset along the first tailgate side edge 22.

Thus, as illustrated in FIGS. 1 to 4, the movable portion 36 of the first jack 28 is, for example, located in the vicinity of the upper tailgate edge 24, while the movable portion 38 of the second jack 30 is, for example, located at a distance from the upper tailgate edge 24 and the lower tailgate edge 25.

The first jack 28 and the second jack 30 are, for example, hydraulic jacks.

According to one embodiment, the rear assembly 10 may be symmetrical with respect to a longitudinal vertical plane of the vehicle.

The opening and closing device 26 then comprises a third jack and a fourth jack (not shown in FIGS. 1 to 4).

The third jack and the fourth jack are then fixed and arranged in a similar manner to the first jack 28 and to the second jack 30.

In fact, the third jack and the fourth jack are each mounted to rotate about the body structure 12, on the one hand, and the second tailgate side edge on the other.

In particular, the third jack and the fourth jack each comprise a fixed portion and a movable portion and are offset between the second side edge of the opening and the second tailgate side edge. The movable portion of the third jack is, for example, located in the vicinity of the upper tailgate edge 24, while the movable portion of the fourth jack is, for example, located midway between the upper tailgate edge 24 and the lower tailgate edge 25.

It is conceivable that such an opening and closing device 26 is capable of offering a multitude of opening positions by varying the position of the moving parts 36, 38 of the jacks 28, 30 with respect to the fixed parts 32, 34, between their retracted end position and their extended end position, and by varying the position of the fixed parts 32, 34 relative to the body structure 12 I order to rotate the fixed parts 32, 34 relative to the body structure 12.

Figure 2:
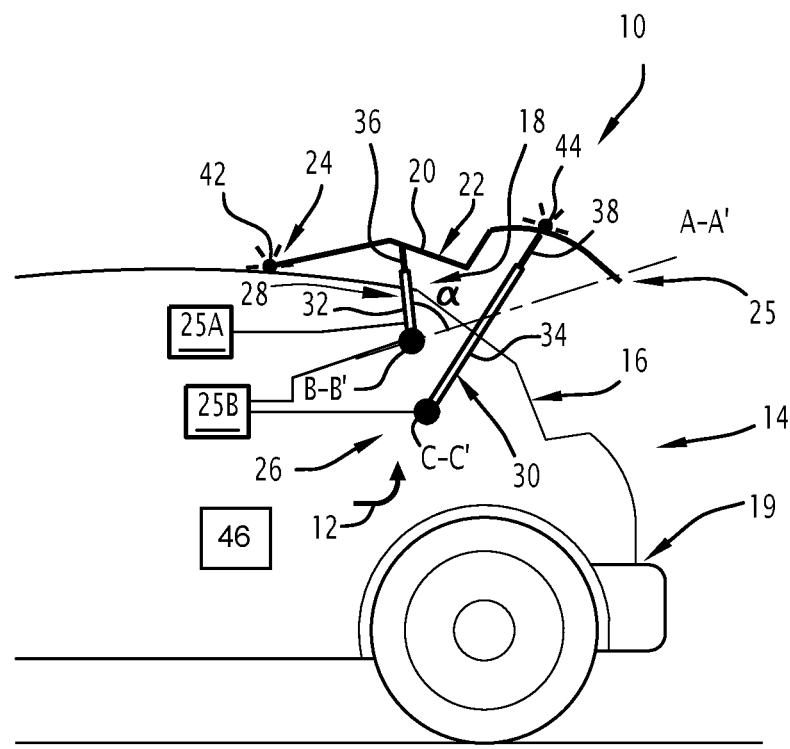
FIG. 2 shows a schematic representation in section of the rear assembly of FIG. 1, wherein the tailgate is in a first open position.

Thus, as shown in FIG. 2, the tailgate 20 occupies a first open position.

In this first open position, the tailgate 20 fully releases access to the opening 14. The upper tailgate edge 24 then rests on the roof of the vehicle.

Figure 3:
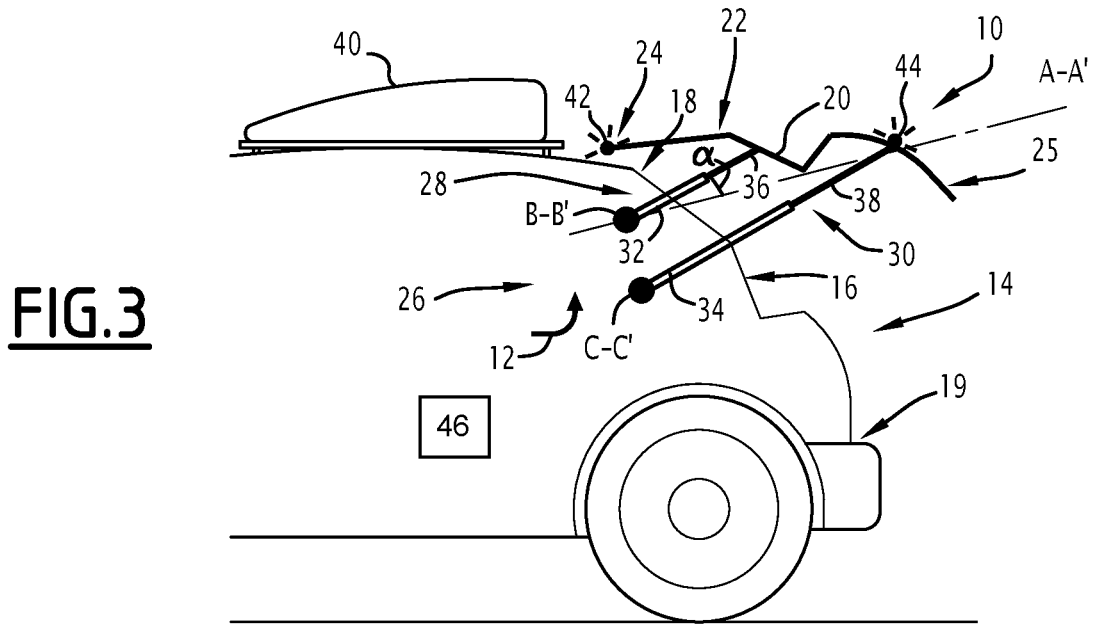
FIG. 3 shows a schematic representation in section of the rear assembly of FIG. 1, wherein the vehicle comprises a roof box and the tailgate is in a second open position.
Figure 4:
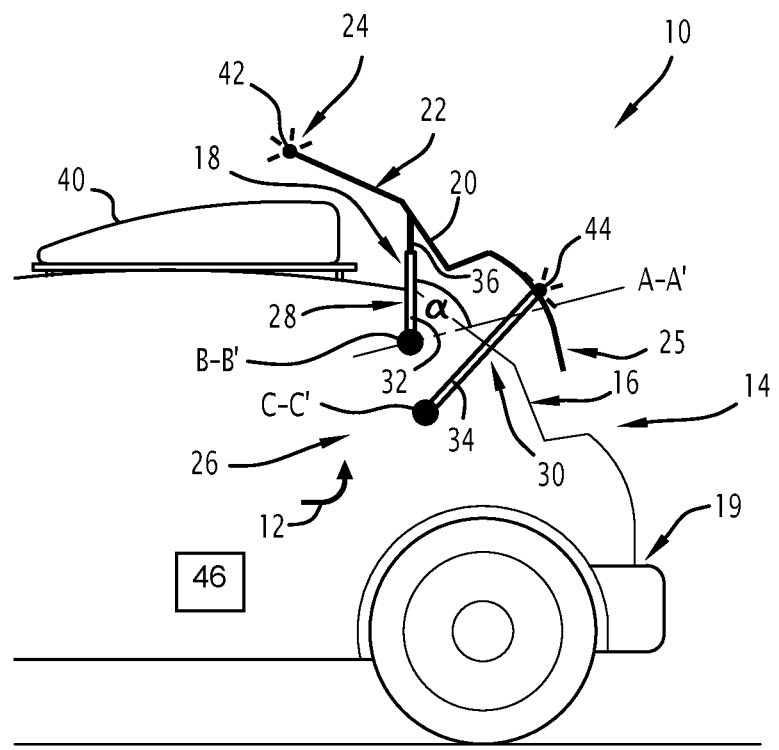
FIG. 4 shows a schematic sectional representation of the rear assembly of FIG. 1, wherein the vehicle comprises a roof box and the tailgate is in a third open position.

As illustrated in FIGS. 3 and 4, the tailgate 20 respectively occupies a second open position and a third open position compatible with a roof box 40.

The second open position is an intermediate position in which the tailgate 20 releases access to the opening 14 while projecting from the rear of the vehicle. This second open position is particularly practical in case of bad weather, the users may then protect themselves while accessing the trunk.

In the third open position, the tailgate 20 almost completely releases access to the opening 14. The tailgate upper edge 24 then rests in part on the roof box 40. This third open position presents reduced bulk.

The rear assembly 10 according to the first embodiment illustrated in FIGS. 1 to 4 comprises, moreover, first angular motorization means 25A and second motorization means 25B.

The first angular motorization means 25A are associated with at least the first jack 28, wherein the first jack 28 defines an angle a with the axis of the opening A-A'.

When the opening and closing device 26 comprises, in a particular embodiment described above, a third jack and a fourth jack, first angular motorization means 25A are associated, for example, with the third jack.

The first angular motorization means 25A are designed to vary or maintain the angle a formed by the first jack 28 and the axis of the opening A-A'.

The first angular motorization means 25A are located at the fixed portion 32 of the first jack 28.

The second motorization means 25B are associated with at least the first jack 28 and the second jack 30.

When the opening and closing device 26 comprises, in a particular embodiment described above, a third jack and a fourth jack, second angular motorization 25B means are associated with the third jack and/or the fourth jack.

The second motorization means 25B are designed to control the displacement of the movable parts 36, 38 of the jacks 28, 30, wherein the displacement of the jacks occurs with the retraction and extension of the jacks between their retracted end position and their extended end position.

In addition, these second motorization means 25B are designed to maintain the first jack 28 and the second jack 30 in an open position or in a closed position.

The rear assembly 10 according to the invention further comprises a computer 46.

The computer is designed to control the first angular motorization means 25A and the second motorization means 25B.

The computer 46 comprises, for example, a set of preset configurations.

The preset configurations define a plurality of opening positions and a plurality of opening kinematics.

The opening position and opening kinematics correspond to a set of preset instructions transmitted by the computer 46 to the first angular motorization means 25A and to the second motorization means 25B in order to drive the jacks so that the tailgate 20 reaches the desired opening position.

Advantageously, the computer 46 may be designed to allow the user to choose between an automatic mode and a manual mode.

In the automatic mode, the opening positions and kinematics are hierarchical in the computer 46 according to the surroundings, wherein the computer 46 is able to implement the most appropriate solution.

In the manual mode, the control of the first angular motorization means 25A and the second motorization means 25B is performed by the user.

The rear assembly 10 according to the invention advantageously comprises at least one obstacle sensor.

FIGS. 1 to 4 illustrate a rear assembly 10 as just described, wherein the rear assembly 10 comprises a first obstacle sensor 42 and a second obstacle sensor 44.

The first obstacle sensor 42 is fixed on the tailgate 20, for example in the vicinity of the upper edge of the tailgate 24.

The positioning of the first obstacle sensor 42 is thus designed to detect, for example, a ceiling or a roof box 40 against which the tailgate 20 would abut when it moves into an open position.

The second obstacle sensor 44 is fixed on the tailgate 20, for example midway between the tailgate upper edge 24 and the tailgate lower edge 25.

The positioning of the second obstacle sensor 44 is thus designed to detect the presence of an object located, for example, at the rear of the vehicle.

The first and second obstacle sensors 42, 44 are, for example, obstacle sensors similar to those used in "parking assistance" applications.

When the opening and closing of the tailgate 20 is controlled in automatic mode according to information provided by the first and second obstacle sensors 42, 44, the computer 46 is designed to determine whether the opening or closing of the tailgate 20 is possible, i.e. without the tailgate 20 coming into contact with an object in its surroundings when moving, or when it reaches one of its open positions.

In addition, the computer 46 is able to determine an opening position and opening kinematics respectively, among the plurality of pre-set opening positions and the plurality of pre-set opening kinematics.

When the opening and closing of the tailgate 20 is controlled in manual mode, the information delivered by the first and second obstacle sensors 42, 44 allows the user to confirm or invalidate the compatibility of their choice with the surroundings, or to automatically move the tailgate to avoid contact with an obstacle.

The operation of the rear assembly 10 according to the invention will now be described.

Initially, a rear assembly 10 is provided with the tailgate 20 in the closed position as shown in FIG. 1.

When the user wishes to clear access to the opening 14 of the body structure 12, he chooses between an automatic mode and a manual mode.

In the automatic mode, the user sends a control signal to the computer 46.

The computer 46 receives the control signal and controls the first angular motorization means and the second motorization means to an open position and with pre-set opening kinematics.

This position and opening kinematics are chosen by the computer 46 according to the information received from the first and second obstacle sensors 42, 44.

Simultaneously, the first jack 28 then rotates about the first axis B-B' which causes the rotation of the second jack 30, while the first jack 28 and the second jack 30 are controlled to extend and/or retract.

Once the open position is reached, the computer 46 maintains the first angular motorization means and the second motorization means in position.

When the user wishes to close the opening 14 of the body structure 12, he sends a signal to the computer 46 that acts in a similar manner to the opening maneuver.

In the manual mode, the user has the information provided by the first and second obstacle sensors 42, 44 and controls the first angular motorization means and the second motorization means. The operation is then similar to that described above and will not be repeated.

It is conceivable that such a rear assembly 10 may have the advantage of offering a very large number of opening positions designed for different surroundings.

The rear assembly 10 thus allows the tailgate 20 to release the opening 14 even in the presence of a roof box 40.

In addition, the presence of the obstacle sensors 42, 44 provides safety and comfort during the opening and closing maneuvers of the tailgate 20.

Of course, other embodiments are possible.

For example, in a first variant, the opening and closing device 26 may comprise two jacks fixed between the body structure 12 and the first tailgate side edge 22, and one jack fixed between the body structure 12 and the second tailgate side edge.

According to a second variant, the opening and closing device 26 may comprise two jacks fixed between the body structure 12 and the first tailgate side edge 22 and an articulated rod between the body structure 12 and the second tailgate side edge.

Alternatively, the first angular motorization means are associated with the second jack 30.

In another variant, such first angular motorization means are associated with the first jack 28 while another jack is fixed between the body structure 12 and the second tailgate side edge.

In another embodiment, all the jacks of the opening and closing device 26 may be associated with such first angular motorization means.

In the same way, in another embodiment, the second motorization means may be associated with all the jacks of the opening and closing device 26.

Finally, depending on the shape of the tailgate 20, other obstacle sensors may, for example, be installed on the tailgate 20 and arranged in a different manner than that illustrated in FIGS. 1 to 4. Alternatively, the rear assembly 10 may comprise only one obstacle sensor if the opening kinematics allow it.

The invention claimed is:

1. Rear assembly of a vehicle comprising:
a body structure, wherein the body structure delimits an opening comprising at least a first side edge of the opening and a second side edge of the opening,
a tailgate, wherein the tailgate is movable relative to the body structure between at least one open position where the opening of the body structure is accessible, and a closed position where the tailgate closes the opening of the body structure, wherein the tailgate comprises at least a first tailgate side edge and a second tailgate side edge, and
an opening and closing device, wherein the opening and closing device fixes the tailgate to the body structure,
wherein the opening and closing device comprises at least a first jack, a second jack, a third jack, and a fourth jack, wherein the first jack and the second jack are each fixed between the body structure and the first tailgate side edge, and wherein the third jack and the fourth jack are fixed between the body structure and the second tailgate side edge;
wherein the first jack, the second jack, the third jack, and the fourth jack each comprises a fixed portion integral with the body structure and a movable portion integral with the tailgate and operable in translation relative to the fixed portion;
wherein the opening defines an axis of opening, at least the first jack defining a first angle with the axis of the opening;
wherein the rear assembly of the vehicle comprises a first motor connected to the fixed portion of the first jack, and wherein operation of the first motor varies the first angle at a constant first jack length;
wherein the rear assembly of the vehicle comprises a second motor connected to the first jack and to the second jack, the second motor being able to control displacement of the movable portion of the first jack and the second jack;
wherein the second motor is different from the first motor;
wherein the first and third jacks are configured to move synchronously when moving the tailgate, and the second and fourth jacks are configured to move synchronously when moving the tailgate.

2. Rear assembly of a vehicle according to claim 1, wherein the first jack and the second jack are offset along the first tailgate side edge.

3. Rear assembly of a vehicle according to claim 1, comprising a computer adapted to drive the first motor and the second motor.

4. Rear assembly of a vehicle according to claim 3, wherein the computer is configured to control the movement of the first jack and the second jack in a plurality of open positions and with a plurality of opening kinematics.

5. Rear assembly of a vehicle according to claim 1, wherein the tailgate comprises at least one obstacle sensor fixed on the tailgate, the obstacle sensor being arranged to detect a presence of at least one object in the surroundings of the tailgate.

6. Rear assembly of a vehicle according to claim 1, wherein the body structure and the tailgate are only connected by the opening and closing device.

\* \* \* \* \*